(12) United States Patent
Ono

(10) Patent No.: US 6,508,711 B1
(45) Date of Patent: Jan. 21, 2003

(54) GAME MACHINE HAVING A MAIN UNIT EXCHANGING DATA WITH A PORTABLE SLAVE MACHINE

(75) Inventor: Yasushi Ono, Tokyo (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/492,158

(22) Filed: Jan. 27, 2000

(30) Foreign Application Priority Data

Jan. 29, 1999 (JP) .......................................... 11-021754

(51) Int. Cl.⁷ ........................... A63F 13/12; G06F 17/30
(52) U.S. Cl. ........................................... 463/43; 463/42
(58) Field of Search ................................. 463/1, 40, 43, 463/44, 42, 7–9, 25, 29; 709/200, 203, 217–219

(56) References Cited

U.S. PATENT DOCUMENTS

| | | | | |
|---|---|---|---|---|
| 4,858,930 A | * | 8/1989 | Sato ............................ | 273/85 |
| 5,051,822 A | * | 9/1991 | Rhoades ...................... | 358/86 |
| 5,054,787 A | * | 10/1991 | Richardson ................. | 273/237 |
| 5,428,528 A | * | 6/1995 | Takenouchi et al. ........ | 364/410 |
| 5,964,660 A | * | 10/1999 | James et al. ................. | 463/1 |
| 5,971,855 A | * | 10/1999 | Ng .............................. | 463/42 |
| 5,987,510 A | * | 11/1999 | Imai et al. .................. | 709/203 |
| 6,024,640 A | * | 2/2000 | Walker et al. ............... | 463/17 |
| 6,165,068 A | * | 12/2000 | Sonoda et al. ............... | 463/8 |
| 6,200,216 B1 | * | 3/2001 | Peppel .......................... | 463/1 |
| 6,406,372 B1 | * | 6/2002 | Turmell et al. ............... | 463/1 |

* cited by examiner

*Primary Examiner*—Valencia Martin-Wallace
*Assistant Examiner*—Steven Asburn
(74) *Attorney, Agent, or Firm*—Rabin & Berdo, P.C.

(57) ABSTRACT

An object of the present invention is to provide a game machine in which mini games of different contents can be sequentially played in a slave machine, and one mini game can be selected out of the plurality of mini games on the side of the slave machine, and then, can be played. In the game machine comprising a main unit for reading a program stored in an external stprage so as to allow a game to be played therein and a slave machine being configured in a portable manner independently of the main unit and having a function of transferring data to or from the main unit, the slave machine enabling mini games as games for the slave machine to be individually played by using programs for the mini games transferred from the main unit and needed for playing the mini games, the plurality of programs for the mini games are transferred as a unit of data from the main unit to the slave machine.

6 Claims, 10 Drawing Sheets

Fig. 3(a)

MASTER MACHINE

| PROGRAM FOR MASTER MACHINE | 13 |
| --- | --- |
| | 131 |
| PROGRAM FOR SLAVE MACHINE | 133 |
| PLAYER DATA 1 | |

Fig. 3(c)

SLAVE MACHINE
(AT TIME OF CAMPING)

| PROGRAM FOR SLAVE MACHINE | PROGRAM REGION |
| --- | --- |
| (MINI GAME 1) (MINI GAME 2) (MINI GAME 3) | 41 411 |
| SELECTING PROGRAM | |
| RESULT OF GAME (POINTS) | |
| PLAYER DATA 1 (FOR SLAVE MACHINE) | 415 DATA REGION |
| PLAYER DATA 1 (CAMP SETTING) | 413 |
| PLAYER DATA 2 | |
| (VOID) | |
| ⋮ | |

Fig. 3(b)

SLAVE MACHINE
(AT TIME OF NOT CAMPING)

| (VOID) | PROGRAM REGION |
| --- | --- |
| | 41 |
| | DATA REGION |
| PLAYER DATA 1 | |
| PLAYER DATA 2 | |
| (VOID) | |
| ⋮ | |

GAME MACHINE HAVING A MAIN UNIT EXCHANGING DATA WITH A PORTABLE SLAVE MACHINE

FIELD OF THE INVENTION

The present invention relates to a game machine in which data can be transferred between a main unit and a slave machine.

BACKGROUND OF THE INVENTION

There has been conventionally a game machine which can execute programs for various games by reading our programs from a recording medium such as a CD and a game player can play the games by operating buttons or the like disposed in the operating unit of the game machine. Furthermore, there has been recently proposed a game machine including a game machine main unit (hereinafter referred to as "a master machine") and a portable slave machine which is detachably attached to the master machine. In such a game machine, a game character and a mini game, which is a game for the slave machine, are transferred to the slave machine, so that the mini game relevant to a game in the master machine can be played in the portable slave machine. For example, in a fighting game, data on a fighter character and a program for a mini game are transferred to the slave machine. A game player can play a mini game for training the fighter character in the slave machine. Moreover, the result of the mini game is returned to the master machine, in which the fighting game can be played by the use of the fighter character who has been powerfully trained.

However, in the conventional game machine, it is only one program for the mini game that can be transferred once. Consequently, whenever a mini game of a different content is intended to be played in the slave machine, the slave machine must be connected to the master machine so as to transfer a program for the mini game therefrom, with an attendant problem of poor ease of use. Additionally, in the conventional game machine, since the slave machine must be connected to the master machine to transfer the program for the mini game therefrom every time the mini game of the different content is intended to be played, the game is interrupted at every time of the transfer, thereby raising the problem of blunting the interest of the game. For example, there may occur the case where a game player wants to sequentially play a mini game for batting practice and a mini game for fielding practice based on one and the same player data. Even in the case where the game player wants to sequentially play the mini games with respect to one and the same character, the game is forced to be interrupted in the conventional game machine every time the mini game is changed.

SUMMARY OF THE INVENTION

The present invention has been accomplished to solve the above-described problems, and therefore, an object of the present invention is to provide a game machine in which mini games of different contents can be sequentially played in a slave machine, and a computer-readable recording medium.

In addition to the above-described object, another object of the present invention is to provide a game machine in which a game player can freely select and play one mini game out of a plurality of mini games on the side of a slave machine, and a computer-readable recording medium.

In order to achieve the above-described objects, in a game machine according to the present invention comprising a main unit for reading a program stored in an external memory so as to allow a game to be played therein and a slave machine being configured in a portable manner independently of the main unit and having a function of transferring data to or from the main unit, the slave machine enabling mini games as games for the slave machine to be individually played by using programs for the mini games transferred from the main unit and needed for playing the mini games, the plurality of programs for the mini games are transferred as a unit of data from the main unit to the slave machine.

Moreover, in a game machine according to the present invention comprising a main unit for reading a program stored in an external memory so as to allow a game to be played therein and a slave machine being configured in a portable manner independently of the main unit and having a function of transferring data to or from the main unit, the slave machine enabling mini games as games for the slave machine to be individually played by using programs for the mini games transferred from the main unit and needed for playing the mini games, the plurality of programs for the mini games and a selecting program for fulfilling a function of selecting one program for the mini game out of the plurality programs for the mini games are transferred as a unit of data from the main unit to the slave machine.

Furthermore, in a game machine according to the present invention, the mini game is a kind of fostering game, and data on a game character to be fostered are transferred to the slave machine simultaneously at the time of the transfer of the program for the mini game, so that the mini game for fostering the game character can be played in the slave machine.

In order to achieve the above-described objects, a computer-readable recording medium according to the present invention stores therein: programs for executing games in a main unit for reading a program stored in an external memory so as to allow a game to be played therein and in a slave machine being configured in a portable manner independently of the main unit and having a function of transferring data to or from the main unit; and a program for fulfilling, in the slave machine, a function of selecting one program for the mini game out of the programs for the mini games transferred to the slave machine simultaneously when the program for allowing the mini game as a game for the slave machine to be played is transferred from the main unit to the slave machine.

BRIEF DESCRIPTION OF THE DRAWINGS

A preferred embodiment of the present invention will be described in detail in reference to the following figures, wherein:

FIGS. 3(a), 3(b) and 3(c) illustrate transfer of data stored in memories when data are transferred between a master machine and a slave machine;

DETAILED DESCRIPTION OF THE PREFERRED EMBODIMENT

Figure 1:
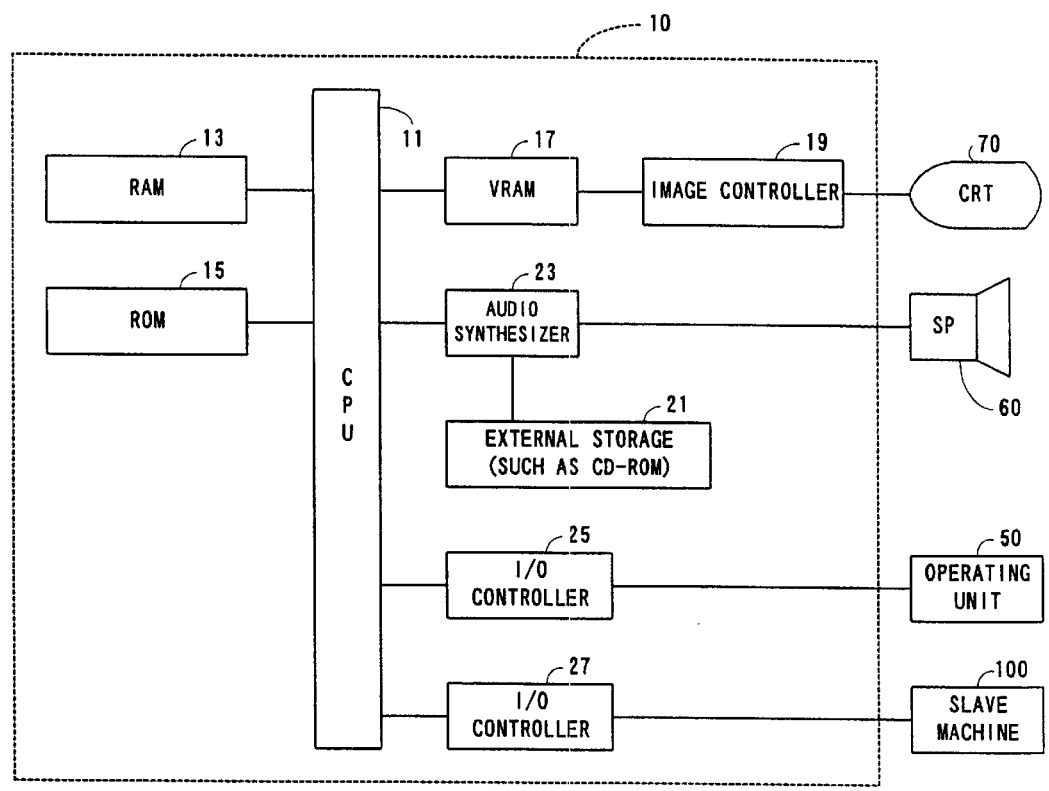
FIG. 1 is a schematic block diagram illustrating a game machine in a preferred embodiment according to the present invention.

A game machine in a preferred embodiment according to the present invention will be described below in detail in reference to the figures. FIG. 1 is a schematic block diagram illustrating the game machine in the preferred embodiment according to the present invention. The game machine in the present embodiment will be described by way of an example in which a baseball game is played. The game machine in the present embodiment comprises: a main unit (a master machine) 10; an operating unit 50 having various kinds of operating buttons for instructing pitching, batting, throwing, advancing and the like; a speaker 60 for generating game sounds such as effective sounds; a display 70; and a portable slave machine 100 capable of mutually transferring data to and from the master machine 10. In the present specification, a program will be treated as one kind of data.

The master machine 10 includes: a CPU 11 for transferring data, interpreting and executing commands, and the like; a RAM 13 to be used as a work area of the CPU 11; a ROM 15 storing therein a system program for initializing the machine main unit and the like; a VRAM 17 for storing images such as letters or characters to be displayed on a screen of the display 70; an image controller 19 for outputting image information to the display 70 on the basis of information stored in the VRAM 17; an external memory 21 such as a CD-ROM, a DVD or an MO storing therein programs for games and the like; an audio synthesizer 23 for generating game sounds such as effective sounds or background music on the basis of the data stored in the external memory 21 or the ROM 15; an I/O controller 25 for controlling data to be input from the operating unit 50; and another I/O controller 27 for controlling data transfer to or from the slave machine 100. The slave machine 100 is provided with a CPU, a memory and the like for executing a program for a mini game, although they are not shown.

Figure 2:
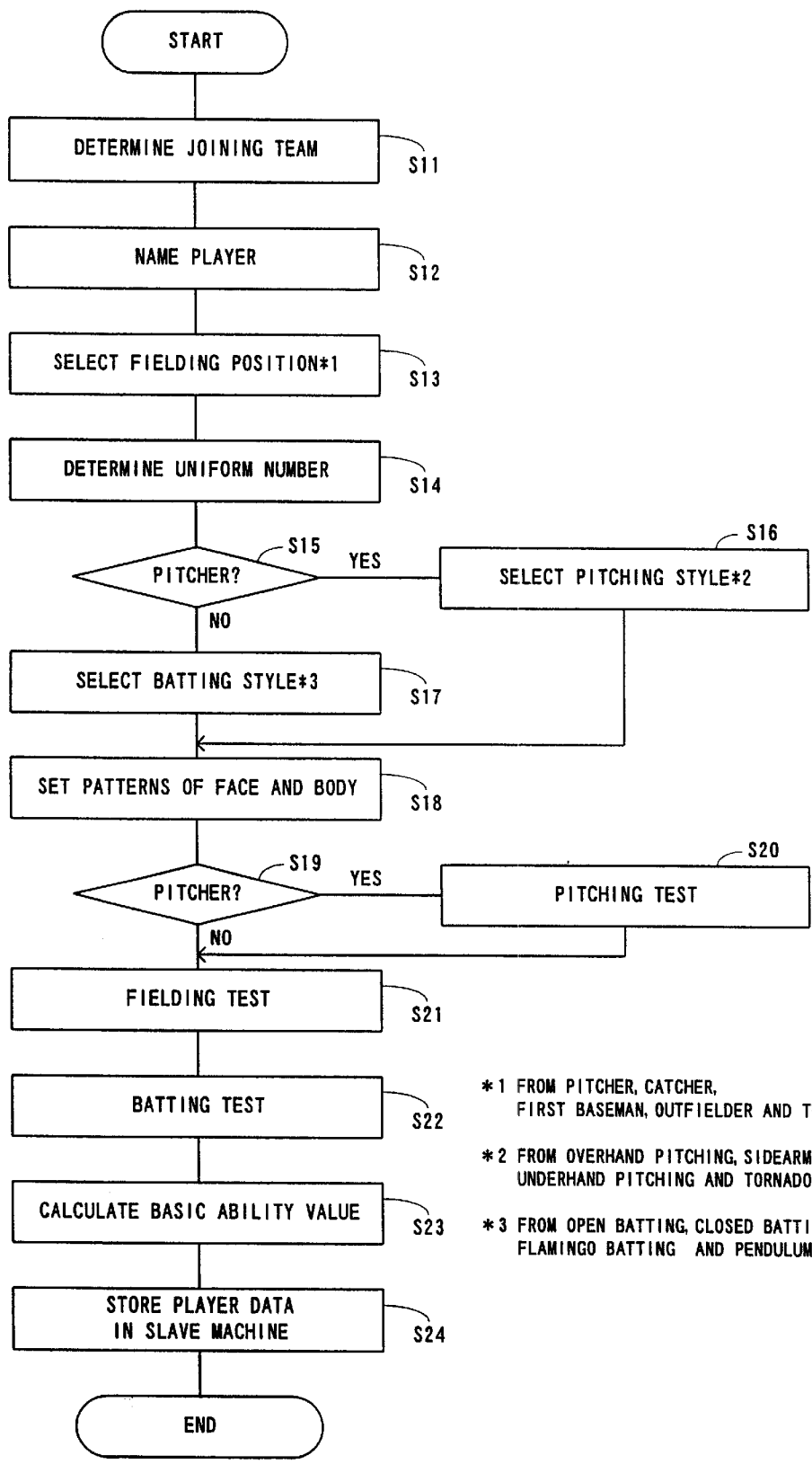
FIG. 2 is a flowchart illustrating creation of new player data in a baseball game played in the game machine according to the present invention.

In playing a mini game by the use of the slave machine 100 in the game machine, for example, player data are first created by using the master machine 10. FIG. 2 is a flowchart for creating new player data in the baseball game which is played in the game machine. When a game player clicks a button for creating the player data displayed on the screen of the display 70 by the use of the operating unit 50, the routine illustrated in the flowchart of FIG. 2 is started to be executed.

In step 11, a team, which plays in this baseball game, is selected out of a plurality of previously registered teams. In step 12, a name of a player to be created is input. Next, in step 13, a fielding position of the player is determined: for example, it is selected out of a pitcher, a catcher, a first baseman, an outfielder and the like. In step 14, a uniform number of the player is determined. In step 15, it is judged whether or not the player is a pitcher. If the player is a pitcher, the routine proceeds to step 16, in which a pitching style is selected out of overhand pitching, sidearm pitching, underhand pitching, tornado pitching and the like. If the player is not a pitcher, the routine proceeds to step 17, in which a batting style is selected out of open batting, closed batting, flamingo batting, pendulum batting and the like. In step 18, the patterns of a face and a body are determined, and thus, the player data are created in such a manner as to suit the preferences of the game player. In this way, the determination of various player data is ended. In the case where the game player does not determine above mentioned player data, previously prepared default values are adopted.

Figure 7:
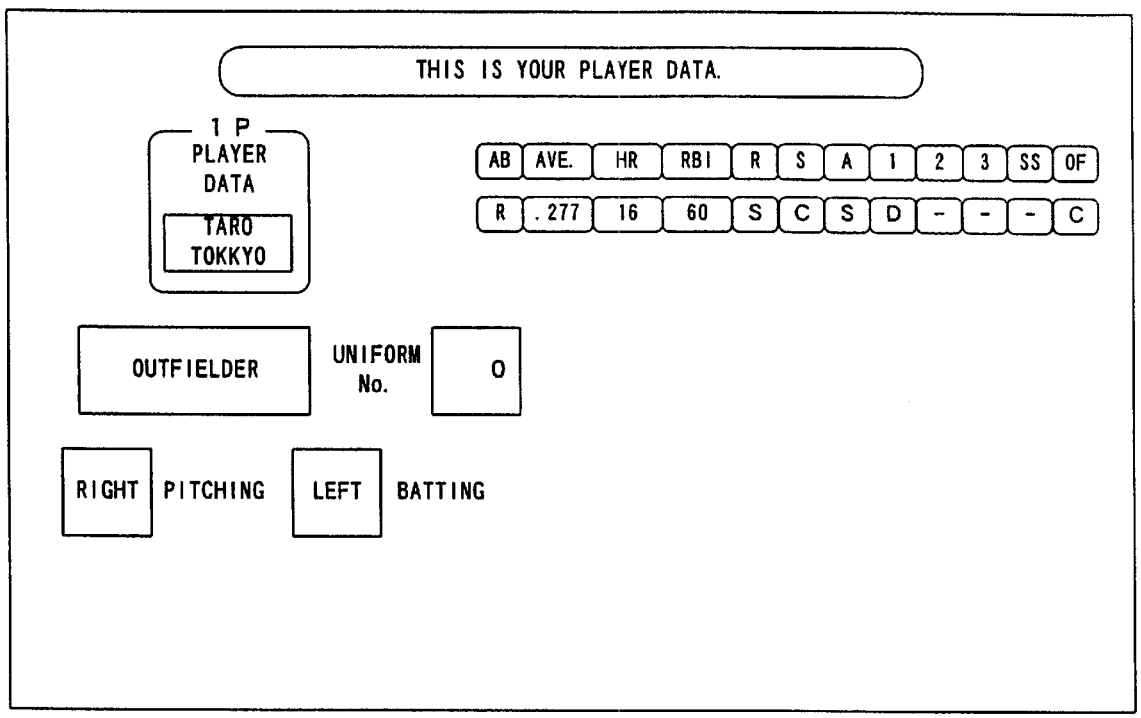
FIG. 7 illustrates a screen on which the result of the created player data is displayed.

Subsequently, various tests are carried out. In step 19, it is judged whether or not the determined player data are those of a pitcher. If the player data are those of the pitcher, a pitching test is carried out in step 20. To the contrary, if the player data are not those of the pitcher, a fielding test is carried out in step 21. Furthermore, in step 22, a batting test is carried out. In these tests, basic ability parameters, e.g., the batting average, the number of home runs, runs batted in and the like are automatically calculated in accordance with algorithm of the program for this game. The results of the calculation are ranked by the use of numeral values or alphabets in the same manner as in an actual baseball game, and then, are displayed (step 23). FIG. 7 illustrates an image in one example of the display, which is displayed on the screen of the display 70. In step 24, the created player data are stored in the slave machine 100. The newly created player data may be stored not in the slave machine 100 but in a memory card, the main unit or the like.

Next, explanation will be made on the state of each of the memories in the case where the data are transferred from the master machine 10 to the slave machine 100 in the game machine in the present embodiment. FIGS. 3(a), 3(b) and 3(c) illustrate the state inside each of the memories when the data are transferred between the master machine 10 and the slave machine 100. Since the description is given by way of the baseball game in the present embodiment, the transfer of the data to the slave machine 100 will also be hereinafter referred to as "camping."

FIG. 3(a) illustrates the state of the memory (RAM) 13 on the side of the master machine 10. The memory 13 illustrated in FIG. 3(a) secures a region 133 storing therein programs for the slave machine and the like in addition to a region 131 storing therein programs for the master machine to be played in the master machine. Here, the programs for the slave machine include programs for various mini games to be played in the slave machine 100 and a program for selecting one mini game out of the plurality of mini games. FIGS. 3(b) and 3(c) illustrate the states of the memory (RAM) 41 on the side of the slave machine 100. FIG. 3(b) illustrates the state before the programs for the slave machine 100 are transferred; and FIG. 3(c) illustrates the state after the programs for the slave machine 100 has been transferred. Furthermore, as illustrated in FIG. 3(b), the plurality of player data created in the master machine 10 can be stored in the memory 41 in the slave machine 100.

When the programs for the slave machine 100 are transferred from the master machine 10 to the slave machine 100, the programs for all of mini games (a mini game 1, a mini game 2 and a mini game 3) stored in the master machine 10 are transferred to a predetermined memory region 411 in the slave machine 100 in the present embodiment. At this time, a selecting program for selecting one mini game out of the plurality of mini games is transferred together with the programs for the mini games. Moreover, at the time of this transferring, the player data read from the slave machine 100 also are transferred, as described later, and then, are stored in a memory region 413 independent of a memory region in which original player data are stored in the slave machine 100. Its own mini game, which is different from the game in the master machine 10 but is relevant to the game of the master machine 10, can be played in amusement in the slave machine 100. In the present embodiment, a mini game for batting practice or a mini game for pitching practice which is part of the baseball game in the master machine 10 can be played in amusement under the name of "camping." The results of the mini game in the slave machine 100, i.e., gained points are stored in a predetermined region 415 in the memory 41. The gained points are finally transferred to the master machine 10, and thus, can be reflected on the game in the master machine 10.

As described above, the data are compatible between the master machine 10 and the slave machine 100 in the game machine in the present embodiment, and therefore, via the data, the games can be played in amusement by individually using the master machine 10 and the slave machine 100. That is, with respect to one and the same baseball game, the games which can be played in amusement only in the master machine 10 can be played in amusement in the master machine 10; and in the meantime, the games which are suitably played in the slave machine 100 can be played in amusement in the slave machine 100.

Figure 4:
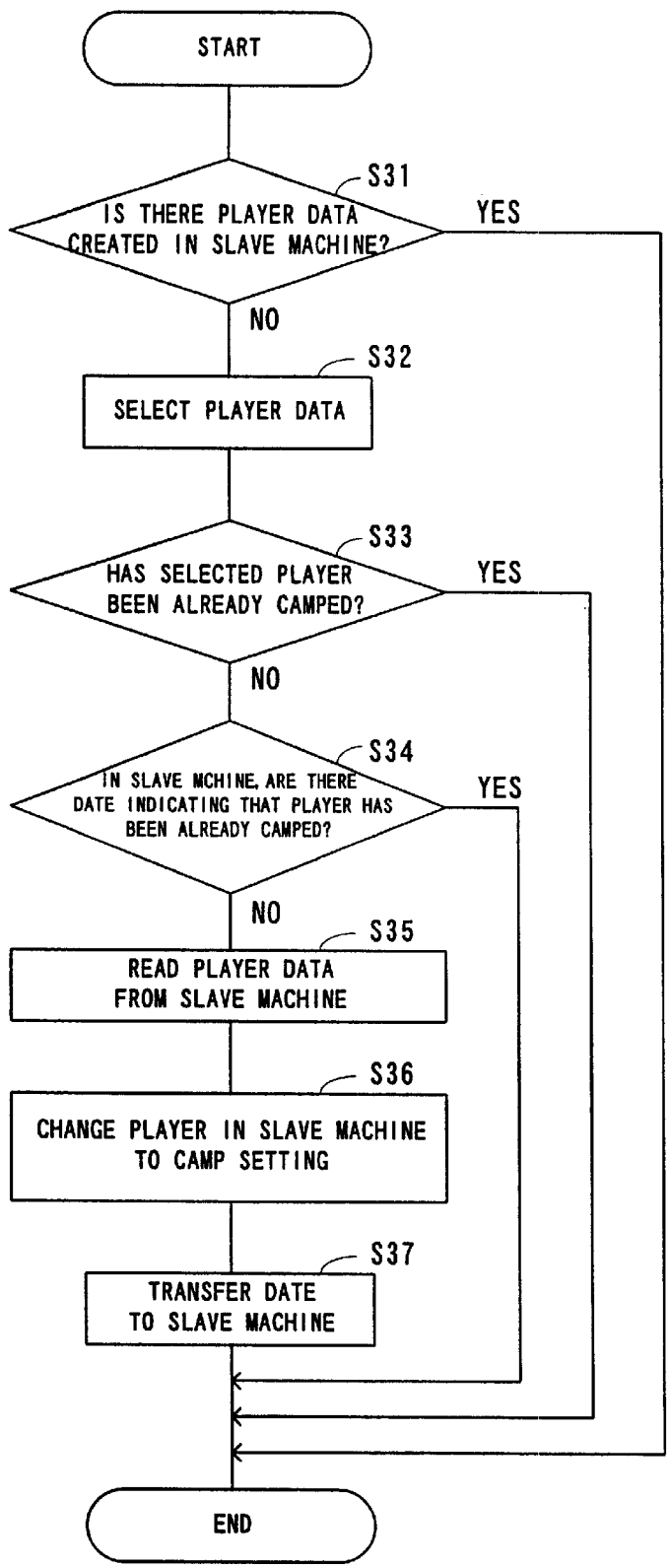
FIG. 4 is a flowchart illustrating transfer of the data from the master machine to the slave machine.
Figure 8:
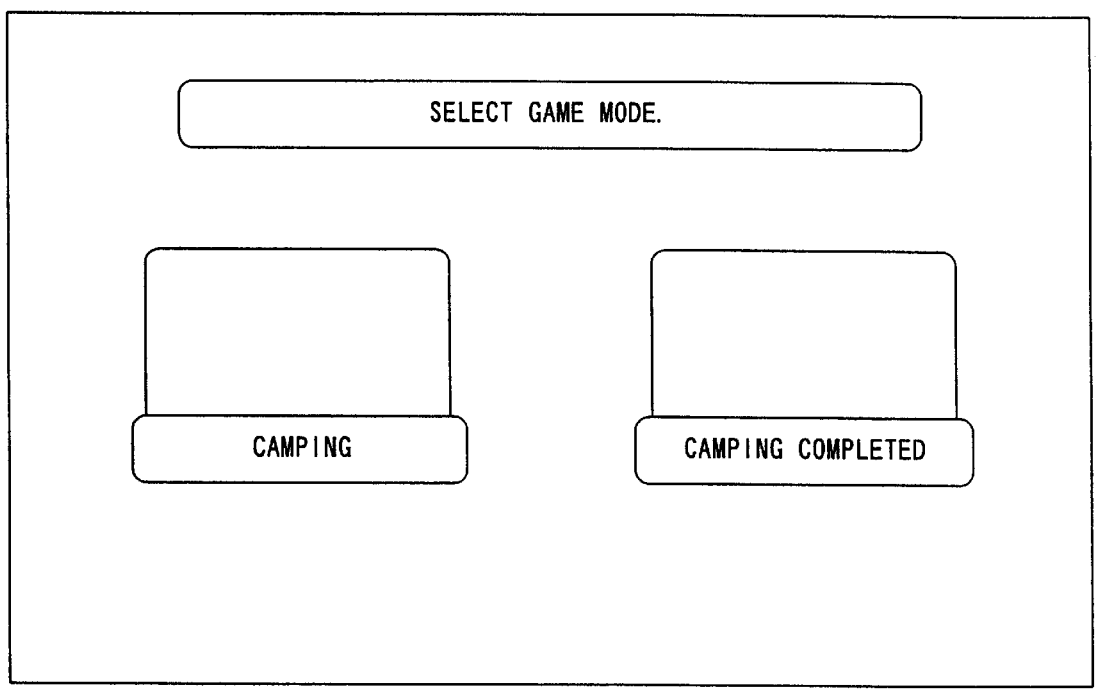
FIG. 8 illustrates a screen on which a game mode is selected.

Subsequently, the procedures when the data are transferred from the master machine 10 to the slave machine 100 will be described below in reference to FIG. 4, which is a flowchart illustrating the transfer of the data from the master machine 10 to the slave machine 100. When the data are transferred from the master machine 10 to the slave machine 100, first, the master machine 10 and the slave machine 100 are set in such a manner that the data can be transferred between the master machine 10 and the slave machine 100. For example, the slave machine 100 is disposed at a predetermined position of the master machine 10; or the master machine 10 and the slave machine 100 are set in such a manner as to achieve infrared communications therebetween. Next, an image illustrated in FIG. 8 is displayed on the screen of the display 70 in the master machine 10, wherein camping is selected by depressing the button disposed in the operating unit 50. Consequently, the routine illustrated in the flowchart of FIG. 4 is executed.

In step 31, it is judged whether or not the player data already created are present in the slave machine 100. If there are no player data, the routine illustrated in the flowchart is jumped to an end. To the contrary, if the player data are present in the slave machine 100, the routine proceeds to step 32, in which the player data are selected. A plurality of player data can be stored in the slave machine 100, as illustrated in FIGS. 3(b) and (c). In the case illustrated in FIG. 3(b), two player data have been already stored in the slave machine 100.

Figure 9:
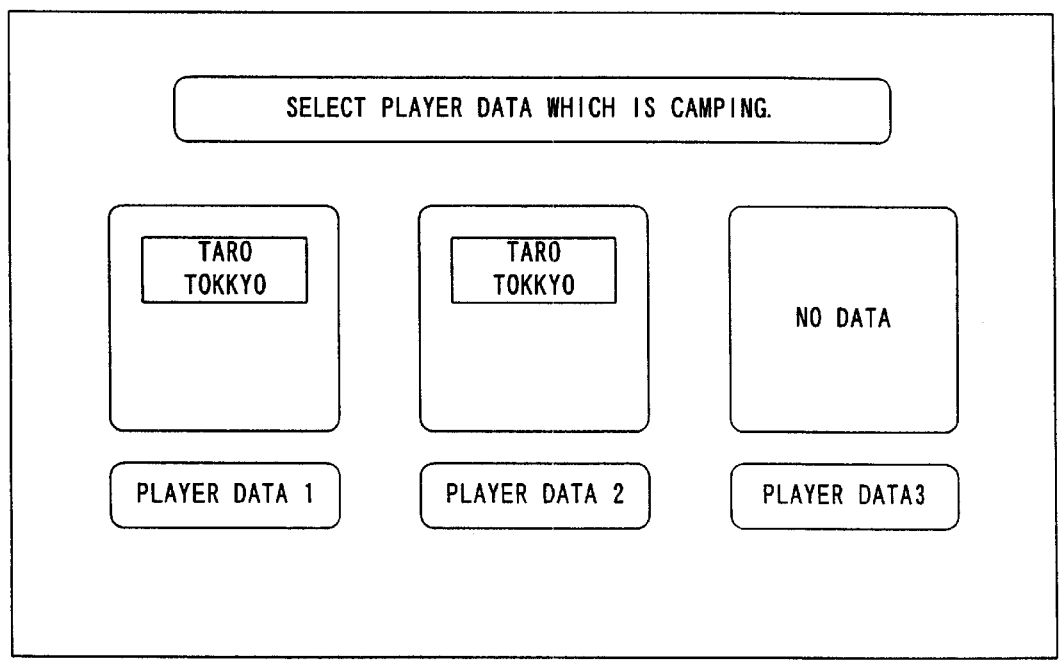
FIG. 9 illustrates a screen on which camping player data is selected.

When the player data are selected, an image illustrated in FIG. 9 is displayed on the screen of the display 70 in the master machine 10. By using the screen, the game player can freely select player data, as he or she wishes, out of the player data created in advance. Here, assume that "player data 1" are selected as the player data. In step 33, it is judged whether or not the selected player data 1 have been already camped. If the selected player data 1 have been already camped, data indicating that the player data 1 have been already camped have been stored in the memory 41 in the slave machine 100, as illustrated in FIG. 3(c). When the player data 1 have been already camped, further camping is unnecessary, whereby the routine illustrated in the flowchart of FIG. 4 is jumped to an end.

To the contrary, if the selected player data 1 have not been camped yet, the routine proceeds to step 34, in which it is judged whether or not data indicating that the player data 1 have been already camped, i.e., the programs for the slave machine 100 are present in the slave machine 100. If the programs for the slave machine 100 are transferred, the selection of the player data is changed on the side of the slave machine 100, so that the player data can be camped, whereby the routine illustrated in the flowchart of FIG. 4 is jumped to an end. To the contrary, if there are no camping player data, the routine proceeds to step 35, in which the player data selected by the game player is read from the slave machine 100, and then, camping is set with respect to the player data in the slave machine 100 (step 36). Thereafter, in step 37, the programs for the slave machine and the player data are transferred as a unit of data from the master machine 10 to the slave machine 100.

As described above, the data are transferred from the master machine 10 to the slave machine 100, and then, the slave machine 100 is detached from the master machine 10 for portable use, thus enabling the mini game to be played in amusement anytime and anywhere by the use of the slave machine 100. Since the player data and the programs for the mini games are transferred to the slave machine 100 as a unit of data, the player data transferred are newly stored at a position (the region 413 in the memory 41 in the slave machine 100) different from a position for the original player data previously stored in the slave machine 100. Furthermore, some of the mini games per se may include player data. In the case where such mini games are used in the slave machine 100, programs for the mini games and a selecting program are transferred, so that the mini game can be played in the slave machine 100 without transferring any player data.

Figure 5:
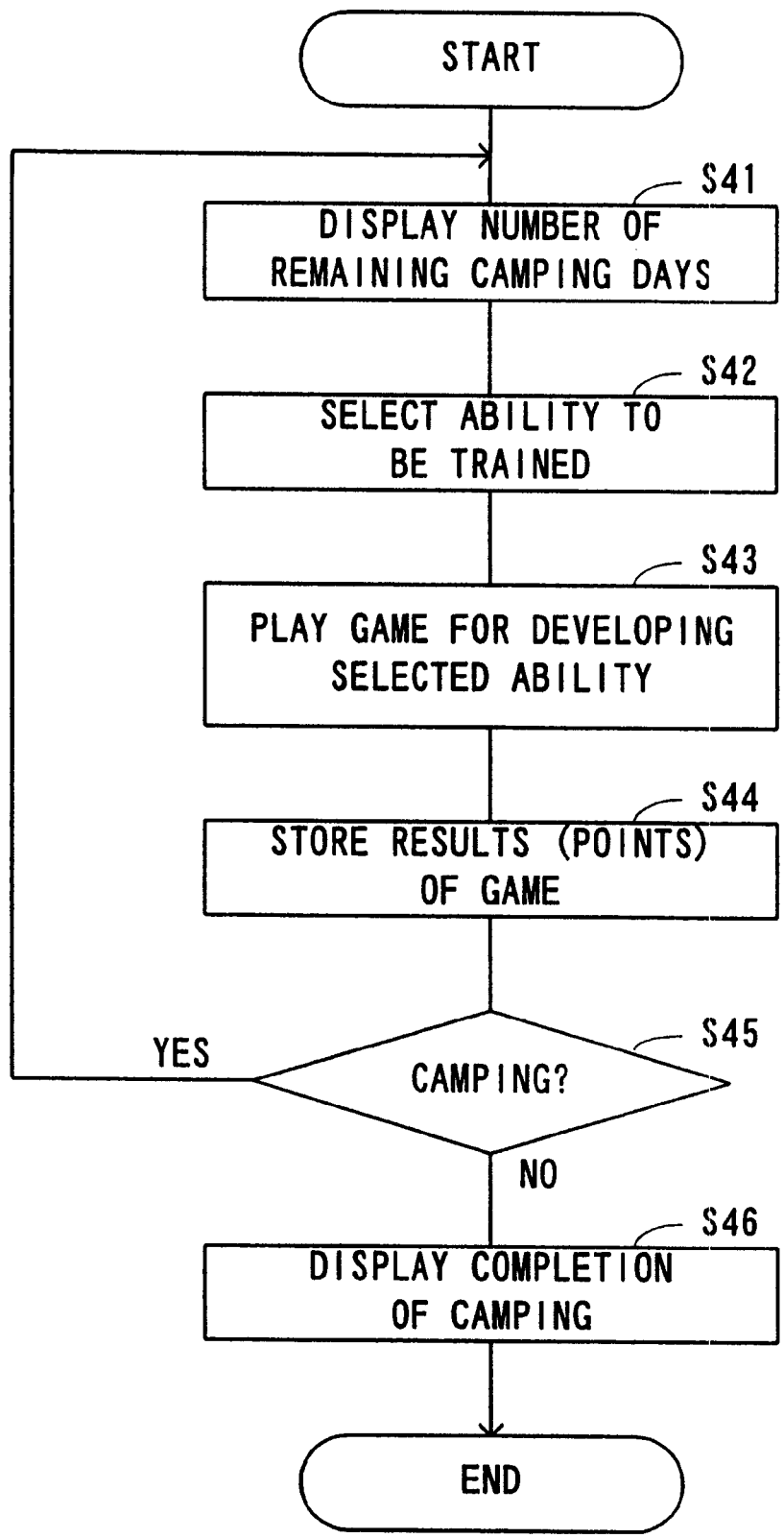
FIG. 5 is a flowchart illustrating the processing when a mini game is played in the slave machine.

Subsequently, the procedures when the mini game is played in the slave machine 100 will be explained below in reference to FIG. 5, which is a flowchart illustrating that the mini game is played in the slave machine 100. When the game player depresses a game starting button disposed in the slave machine 100, the routine illustrated in the flowchart of FIG. 5 is executed. First, the number of remaining camping days is displayed on the screen of the slave machine 100 (step 41). Next, there is displayed a screen on which an ability to be trained is selected. That is, in the present embodiment, since there are prepared pitching practice, batting practice, reflex training practice and the like as the mini games, the game player selects one mini game out of these mini games (step 42), thereby enabling the mini game selected by the game player to be played.

In step 43, the mini game is played by the game player. When the game player depresses a game ending button, points gained in the game are stored in the memory (step 44). In step 45, it is judged whether or not the camping period has been completed. If the camping period has not completed yet, the routine returns to step 41, in which the number of remaining camping days is displayed. If the camping period has been already completed, there is displayed on the screen of the slave machine 100 that the camping period has been already completed (step 46).

Figure 6:
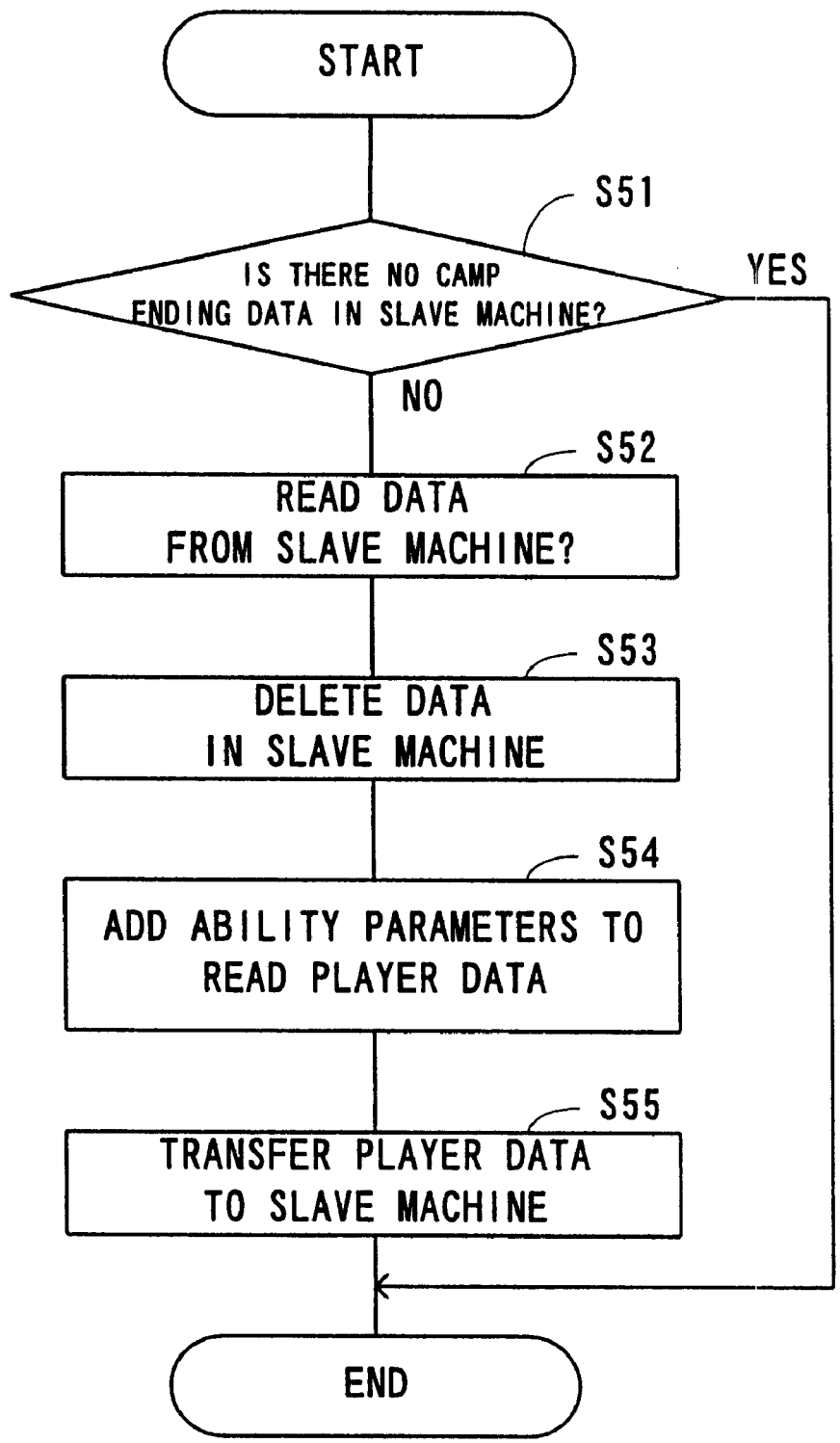
FIG. 6 is a flowchart illustrating transfer of the data from the slave machine to the master machine.

Next, description will be given of the transfer of the data from the slave machine 100 to the master machine 10 in reference to FIG. 6, which is a flowchart illustrating the transfer of the data from the slave machine 100 to the master machine 10. In order to transfer the data from the slave machine 100 to the master machine 10, the slave machine 100 and the master machine 10 are previously set in such a manner that the data can be transferred between the master machine 10 and the slave machine 100. This setting manner is the same as the setting manner when the data is transferred from the master machine 10 to the slave machine 100. Thereafter, an image illustrated in FIG. 8 is displayed on the screen of the display 70 on the side of the master machine 10, and then, a camp ending button is selected. Consequently, the routine illustrated in the flowchart of FIG. 6 is executed.

Figure 10:
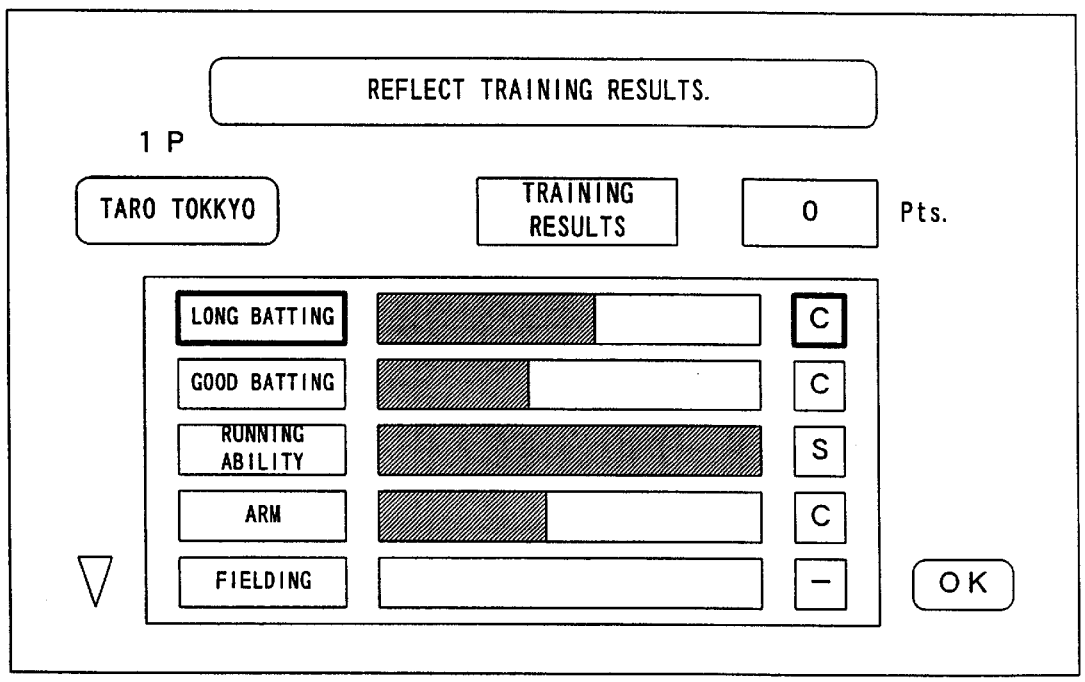
FIG. 10 illustrates a screen on which the result of the mini game played in the slave machine is displayed.

In step 51, it is judged whether or not camp ending data are present in the slave machine 100. If there are no camp ending data, the routine illustrated in the flowchart of FIG. 6 need not be executed, and therefore, comes to an end. To the contrary, if there are camp ending data, the data are read from the slave machine 100 (step 52). At this time, at least the player data and the data indicating the results (points) of the game are transferred. Otherwise, at this time, the master machine 10 may read the programs for the slave machine 100 and rewrite the programs for the slave machine 100 on the side of the master machine 10. In step 53, the data in the slave machine 100 are deleted. At this moment, not only the gained points but also the programs for the slave machine and the player data stored in the memory region 413 illustrated in FIG. 3(c) are deleted together. In step 54, the points as the results of the game in the slave machine 100 are added to the ability parameters of the read-in player data. In the present embodiment, the game player can display an image illustrated in FIG. 10 on the screen of the display 70, to freely select the ability parameters which he or she wishes to develop.

The point adding process may be automatically performed in the master machine 10 or the slave machine 100. For example, if the mini game of the batting practice is performed in the slave machine 100, the points may be automatically added to the data in such a manner as to develop the batting ability. In step 55, the player data after the ability development are overwritten in the original player data before the camping. In this case, the player data overwritten in the memory in the slave machine 100 are data in which camping setting is released. Consequently, the player data can be camped again.

According to the game machine in the present embodiment, the plurality of programs for the mini games can be transferred as a unit of data from the master machine 10 to the slave machine 100. At the time of the transfer, the program for selecting one mini game out of the plurality of mini games can be transferred together on the side of the slave machine 100. Therefore, it is not necessary to transfer the program for the mini game every time the mini game is changed, thus improving the ease of use in comparison with the conventional game machines.

Moreover, the game machine in the present embodiment can be applied to a commercially available game machine, for example, Play Station (a trade mark of Sony Corporation) or the like without making any adaptation thereon, and therefore, no additional hardware is needed.

It is to be understood that the present invention is not restricted to the particular embodiment given above, and that various modifications and alterations can be added thereto without departing from the scope of the invention. For example, although the foregoing embodiment has been described above by way of the baseball game, the games played in the game machine according to the present invention may include other ball games, fighting games, roll playing games and the like.

Additionally, although the foregoing embodiment is described above by way of the case where the selecting program is transferred simultaneously when the program for the mini game is transferred, the present invention is not restricted to this case, and the programs for the mini games may be automatically switched in sequence on the side of the slave machine 100 without using any selecting program.

According to the present invention, the programs for fulfilling the functions in the above-described embodiment may be stored in a computer-readable recording medium. As the recording medium can be used a floppy disk, a hard disk, an optical disk, a magneto-optic disk, a CD-ROM, a DVD-ROM and the like.

As is obvious from the above description, according to the present invention, when the programs for the mini games are transferred from the main unit to the slave machine, the plurality of programs for the mini games can be transferred once as a unit of data. Moreover, according to the present invention, when the plurality of programs are transferred, the selecting program for fulfilling the function of selecting one program for the mini game out of the plurality of programs for the mini games can be transferred together. Therefore, it becomes remarkably easy to change the mini game in the slave machine, and the mini games of the different contents can be played sequentially. Thus, it is possible to provide the game machine in which operability can be enhanced.

What is claimed is:

1. A game machine comprising a main unit for reading a program stored in an external storage so as to allow a game to be played therein and a slave machine being configured in a portable manner independently of the main unit and having a function of transferring data to and from the main unit, the slave machine enabling mini games as games for the slave machine to be individually played by using programs for the mini games transferred from the main unit and needed for playing the mini games, the main unit enabling the game to be played therein using data resulting from the mini games played on the slave machine, the data being transferred from the slave machine to main unit, and a plurality of programs for mini games being transferred as a unit of data from the main unit to the slave machine.

2. A game machine comprising a main unit for reading a program stored in an external storage so as to allow a game to be played therein and a slave machine being configured in a portable manner independently of the main unit and having a function of transferring data to and from the main unit, the slave machine enabling mini games as games for the slave machine to be individually played by using programs for the mini games transferred from the main unit and needed for playing the mini games, the main unit enabling the game to be played therein using data resulting from the mini games played on the slave machine, the data being transferred from the slave machine to main unit, and a plurality of programs for mini games and a selecting program for fulfilling a function of selecting one program for mini games out of the plurality of programs for the mini games being transferred as a unit of data from the main unit to the slave machine.

3. A game machine as claimed in claim 1, wherein the mini game is a kind of fostering game, and data on a game character to be fostered are transferred to the slave machine simultaneously at the time of the transfer of the program for the mini game, so that the mini game for fostering the game character can be played in the slave machine.

4. A game machine as claimed in claim 2, wherein the mini game is a kind of fostering game, and data on a game character to be fostered are transferred to the slave machine simultaneously at the time of the transfer of the program for the mini game, so that the mini game for fostering the game character can be played in the slave machine.

5. Computer-readable recording medium storing therein:
   a program for fulfilling, in a main unit, a function of reading programs for executing games recorded to an external recording device, and executing the games;
   a program for fulfilling, in a slave machine, a function of individually playing mini games as games for the slave machine by using programs for the mini games transferred from the main unit, the slave machine being configured in a portable manner independently of the main unit and having a function of transferring data to and from the main unit;
   a program for fulfilling, in the main unit, a function of executing the games read from the external storage device, using data resulting from the mini games played on the slave machine, which data is transferred from the slave machine to the main unit; and
   a program for fulfilling, in the slave machine, a function of selecting one program for the mini game out of the programs for the mini games, transferred to the slave machine simultaneously when the program for allowing the mini game as a game to the slave machine to the played is transferred from the main unit to the slave machine.

6. An article of manufacture for use in a game machine, comprising:
   a computer readable medium; and
   computer programming stored in the medium;
   wherein the stored programming is configured to be readable from the computer readable medium by a computer to thereby cause the computer to operate so as to:
      read a program stored in an external storage so as to allow a game to be played in a main unit of the game machine;
      transfer as a unit of data from the main unit to a slave machine, a plurality of programs for mini games to be individually played on the slave machine, the slave machine being configured in a portable manner to operate independently of the main unit and to be capable of transferring data to and from the main unit;
      transfer from the slave machine to the main unit of data resulting from the mini games played on the slave machine, the main unit enabling the game to be played thereon to be executed using the transferred data resulting from the mini games; and
      transfer from the main unit to the slave unit simultaneously with the plurality of programs for mini games, a program for fulfilling in the slave machine a function of selecting for playing in the slave machine one of the transferred mini games.

* * * * *